US009975323B2

(12) United States Patent
Chan et al.

(10) Patent No.: US 9,975,323 B2
(45) Date of Patent: May 22, 2018

(54) 3D PRINTING COLORIZATION

(71) Applicant: 3D Systems, Incorporated, Rock Hill, SC (US)

(72) Inventors: Joel Chan, West Linn, OR (US); Mark R. Parker, Portland, OR (US); Edward Sheufelt, Oregon City, OR (US); Jule W. Thomas, Jr., West Linn, OR (US); Dong Hoon Lee, Seoul (KR)

(73) Assignee: 3D Systems, Inc., Rock Hill, SC (US)

( * ) Notice: Subject to any disclaimer, the term of this patent is extended or adjusted under 35 U.S.C. 154(b) by 430 days.

(21) Appl. No.: 14/644,621

(22) Filed: Mar. 11, 2015

(65) Prior Publication Data

US 2015/0258770 A1    Sep. 17, 2015

Related U.S. Application Data

(60) Provisional application No. 61/950,906, filed on Mar. 11, 2014, provisional application No. 61/978,795, filed on Apr. 11, 2014.

(51) Int. Cl.
*B32B 3/10* (2006.01)
*B33Y 50/02* (2015.01)
(Continued)

(52) U.S. Cl.
CPC ............ *B33Y 50/02* (2014.12); *B29C 64/106* (2017.08); *B29C 64/112* (2017.08);
(Continued)

(58) Field of Classification Search
None
See application file for complete search history.

(56) References Cited

U.S. PATENT DOCUMENTS 9,556,346 B2    1/2017  Suzuki et al.
2004/0080078 A1  4/2004  Collins
(Continued)

FOREIGN PATENT DOCUMENTS

JP    2006-503735    2/2006
JP    2012-111226    6/2012
WO    2008077850    7/2008

OTHER PUBLICATIONS

PCT International Search Report of the International Searching Authority for International Application No. PCT/US2015/019894, dated May 20, 2015 (4 pages).
(Continued)

*Primary Examiner* — Christopher Polley

(57) ABSTRACT

In one aspect, methods of printing a color 3D article are described herein. In some embodiments, a method described herein comprises receiving data representing a surface colorization of the article, and transforming the data representing the surface colorization of the article into voxel data of the article. The voxel data comprises (a) location values and at least one of (b) color values and (c) transparency values for a plurality of columns of voxels normal or substantially normal to a surface of the article. The method further comprises selectively depositing layers of one or more build materials onto a substrate to form the article in accordance with the voxel data. In addition, at least one column of the plurality of columns of voxels exhibits a surface color resulting from a combination of colors of a plurality of voxels of the column.

12 Claims, 9 Drawing Sheets

(51) Int. Cl.
  *G05B 19/4093* (2006.01)
  *C09D 11/101* (2014.01)
  *C09D 11/322* (2014.01)
  *B29C 64/106* (2017.01)
  *B29C 64/112* (2017.01)
  *B29C 64/165* (2017.01)
  *B29C 64/386* (2017.01)
  *B33Y 10/00* (2015.01)
  *B33Y 70/00* (2015.01)
  *B33Y 80/00* (2015.01)
  *B29L 9/00* (2006.01)

(52) U.S. Cl.
  CPC .......... *B29C 64/165* (2017.08); *B29C 64/386* (2017.08); *C09D 11/101* (2013.01); *C09D 11/322* (2013.01); *G05B 19/4093* (2013.01); *B29K 2995/0021* (2013.01); *B29L 2009/005* (2013.01); *B33Y 10/00* (2014.12); *B33Y 70/00* (2014.12); *B33Y 80/00* (2014.12); *Y10T 428/269* (2015.01); *Y10T 428/31551* (2015.04)

(56) References Cited

U.S. PATENT DOCUMENTS

2013/0234370 A1* 9/2013 Suzuki ................ B29C 67/0059
                                                        264/401

2016/0263826 A1 9/2016 Suzuki et al.
2016/0264796 A1 9/2016 Suzuki et al.

OTHER PUBLICATIONS

PCT Written Opinion of the International Search Authority for International Application No. PCT/US2015/019894, dated May 20, 2015 (5 pages).

PCT International Preliminary Report on Patentability for International Application No. PCT/US2015/019894, dated Sep. 22, 2016 (7 pages).

Alan Brunton et al., "Pushing the Limits of 3D Color Printing: Error Diffusion with Translucent Materials", ACM Transactions on Graphics, arXiv:1506.02400v1 [cs.GR], Jun. 8, 2015, pp. 1-15.

Yue Dong et al., "Fabricating Spatially-Varying Subsurface Scattering", ACM Transactions on Graphics, vol. 29, No. 4, Article 62, Publication Date: Jul. 2010, pp. 62:1-62:10.

Milos Hasan et al., "Physical Production of Materials with Specified Subsurface Scattering", ACM Transactions on Graphics, 2010, 9 pages.

Kiril Vidimce et al., "OpenFab: A Programmable Pipeline for Multi-Material Fabrication", ACM Transactions on Graphics, 2013, 11 pages.

First Office Action for Japanese Patent Application No. 2016-554660, dated Sep. 5, 2017 (4 pages).

* cited by examiner

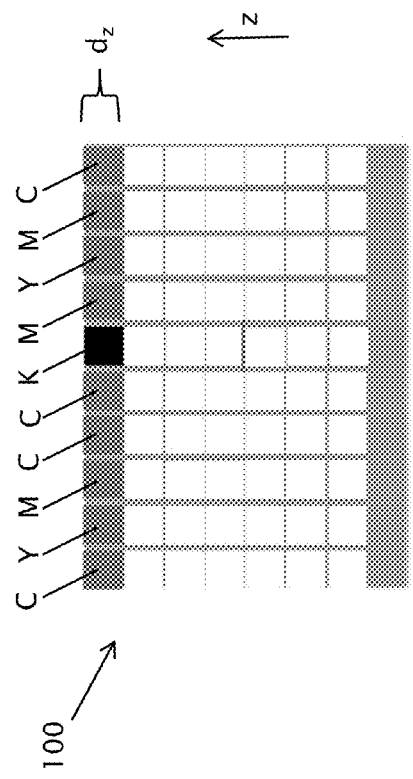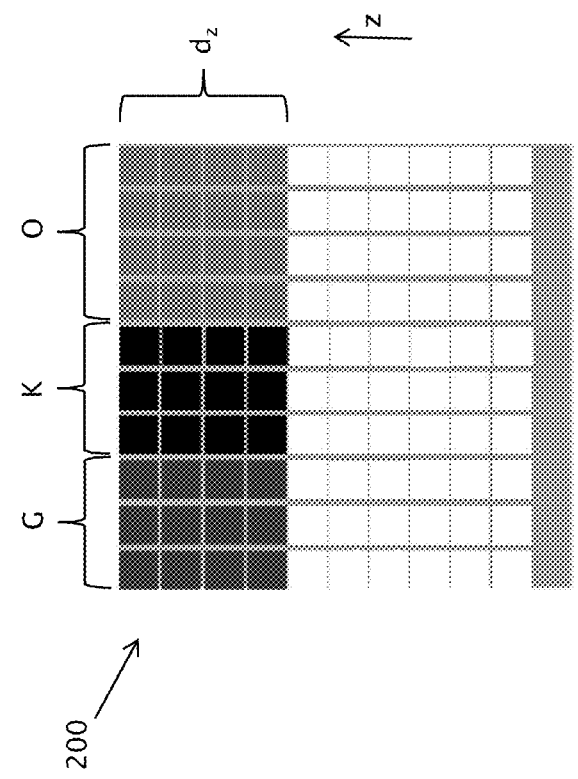
FIG. 1
PRIOR ART
FIG. 2
PRIOR ART

FIG. 3

| Requested 3D Part Color | | | Layer 1 | Layer 2 | Layer 3 | Layer 4 | Layer 5 | Layer 6 | Layer 7 | Layer 8 |
|---|---|---|---|---|---|---|---|---|---|---|
| R = 255 | G = 0 | B = 0 | M | Y | M | Y | M | Y | M | Y |
| R = 255 | G = 16 | B = 16 | M | Y | M | Y | M | Y | CL | CL |
| R = 255 | G = 32 | B = 32 | M | Y | M | Y | CL | CL | M | Y |
| R = 255 | G = 48 | B = 48 | M | Y | CL | CL | M | Y | M | Y |
| R = 255 | G = 64 | B = 64 | CL | CL | M | Y | M | Y | M | Y |
| R = 255 | G = 80 | B = 80 | M | Y | M | Y | Y | Y | CL | CL |
| R = 255 | G = 96 | B = 96 | CL | M | Y | M | Y | CL | CL | CL |
| R = 255 | G = 112 | B = 112 | CL | CL | M | Y | M | Y | CL | CL |
| R = 255 | G = 127 | B = 127 | CL | CL | CL | M | Y | M | Y | CL |
| R = 255 | G = 143 | B = 143 | CL | CL | CL | CL | M | Y | CL | CL |
| R = 255 | G = 159 | B = 159 | M | Y | CL | Y | Y | Y | CL | Y |
| R = 255 | G = 175 | B = 175 | CL | M | M | M | M | M | M | CL |
| R = 255 | G = 191 | B = 191 | CL | CL | CL | CL | Y | Y | CL | CL |
| R = 255 | G = 207 | B = 207 | CL | CL | CL | CL | M | CL | CL | CL |
| R = 255 | G = 223 | B = 223 | CL | CL | CL | CL | CL | Y | Y | CL |
| R = 255 | G = 239 | B = 239 | CL | CL | CL | CL | CL | M | CL | CL |
| R = 255 | G = 255 | B = 255 | CL | CL | CL | CL | CL | CL | CL | CL |

3D PRINTING COLORIZATION

CROSS REFERENCE TO RELATED APPLICATIONS

This application claims priority pursuant to 35 U.S.C. § 119 to U.S. Provisional Patent Application Ser. No. 61/950,906, filed on Mar. 11, 2014, and to U.S. Provisional Patent Application Ser. No. 61/978,795, filed on Apr. 11, 2014, each of which is hereby incorporated by reference in its entirety.

FIELD

The present invention relates to methods and materials for three-dimensional (3D) printing and, in particular, to methods and materials for printing color 3D articles or objects.

BACKGROUND

Commercially available 3D printers, such as the ProJet™ 3D Printers manufactured by 3D Systems of Rock Hill, S.C., use build materials (also referred to as inks in some instances) that are jetted through a print head as a liquid to form various 3D articles or parts. Other 3D printing systems also use a build material that is jetted through a print head. In some instances, the build material is solid at ambient temperatures and converts to liquid at elevated jetting temperatures. In other instances, the build material is liquid at ambient temperatures. Still other 3D printers form 3D articles or objects from a reservoir, vat, or container of a fluid build material or powdered build material. In some cases, a binder material or a laser or other source of energy is used to selectively solidify or consolidate layers of the build material in a stepwise fashion to provide the 3D article.

Build materials for 3D printing systems can include one or more colorants or pigments to provide colored printed parts. However, many such build materials are much more highly pigmented than necessary or desired to provide colored printed parts. Moreover, the presence of pigments in many build materials can interfere with the jettability, stability, and/or curability of the inks. In addition, the pigment load of some pigmented build materials can require different types and/or amounts of photoinitiators to obtain appropriate curing of build materials having different colors, which can result in decreased efficiency and/or increased cost of a 3D printing process.

Moreover, prior methods of printing color 3D articles fail to provide 3D articles having variation in color with depth from the surface of the articles, thus limiting the colorization of 3D printed parts.

Therefore, there exists a need for improved methods of color 3D printing and improved build materials for color 3D printing.

SUMMARY

In one aspect, methods of printing a color 3D article are described herein which, in some embodiments, may provide one or more advantages over some previous methods of printing a 3D article. For example, in some cases, a method described herein can provide a 3D printed article having a surface colorization in which the observed color is not produced only by surface pixels of color, such as pixels of color that may be dithered or mixed in only two dimensions (x and y) in a surface plane. Instead, methods described herein can provide a 3D printed article having a surface colorization that results from a combination of color values and/or other visual effects (such as halftoning or dithering) in three dimensions (x, y, and z). In some instances, such a surface colorization can be provided by a thin shell or "skin" of colored voxels, including voxels arranged in a plurality of columns normal or substantially normal to the surface of the article. A method described herein, in some cases, can also provide a 3D article having a full-color surface colorization using only a small number of differently colored build materials.

A method of printing a 3D article described herein, in some embodiments, comprises receiving data representing the surface colorization of the article and transforming the data representing the surface colorization of the article into voxel data of the article. The voxel data comprises (a) location values and at least one of (b) color values and (c) transparency values for a plurality of columns of voxels normal or substantially normal to a surface of the article. Moreover, the method further comprises selectively depositing layers of one or more build materials onto a substrate to form the article in accordance with the voxel data. Additionally, at least one column of the plurality of columns of voxels can exhibit or provide a surface color that results from a combination of colors of a plurality of stacked voxels of the column. Further, in some embodiments, a plurality of columns of voxels each exhibit or provide a surface color resulting from a combination of voxels within each column. Moreover, in some cases, the plurality of columns of voxels together provides an appearance to the surface of the article that corresponds to the desired surface colorization of the article. In addition, in some instances, at least one column of the plurality of columns of voxels includes voxels having different color values and/or different transparency values.

Further, in some embodiments, at least one build material used to form an article according to a method described herein is optically transparent or substantially optically transparent. In some cases, at least one build material used to form the article comprises a composite ink comprising an optically transparent or substantially optically transparent carrier ink comprising a curable material, and a colorant dispersed in the carrier ink in an amount of about 0.01 to 5 weight %, based on the total weight of the composite ink. Other build materials may also be used.

In another aspect, 3D printed articles are described herein. In some embodiments, such a 3D printed article is provided according to a method described herein. Thus, in some cases, a 3D printed article described herein comprises an interior region and a color skin region disposed over the interior region in a z-direction, wherein the color skin region is defined by a plurality of columns of voxels substantially normal to a surface of the article, and wherein at least one column of the plurality of columns of voxels exhibits a surface color resulting from a combination of colors of a plurality of voxels of the column. The interior region of such an article, in some instances, is black in color or white in color. An interior region of an article described herein can also be opaque, translucent, or optically reflective. Moreover, in some embodiments, at least one column of the plurality of columns of voxels includes voxels having different color values and/or different transparency values. An article described herein can also include an opacity skin region and/or a reflective skin region disposed between the color skin region and the interior region of the article in a z-direction. Such an opacity region, in some instances, is formed from a plurality of opaque voxels. Similarly, a reflective skin region can be formed from a plurality of reflective voxels.

In still another aspect, build materials for use with a 3D printer and/or 3D printing method are described herein which, in some embodiments, may offer one or more advantages over prior build materials. In some embodiments, for example, a build material described herein provides printed parts that have improved chroma or chromaticity. In addition, in some cases, a build material described herein is a curable ink having excellent jettability and/or high colloidal stability.

In some embodiments, a build material described herein is a composite ink. A composite ink, in some instances, comprises an optically transparent or substantially transparent carrier ink comprising a curable material; and a colorant dispersed in the carrier ink in an amount of about 0.01 to 5 weight %, based on the total weight of the composite ink. Further, in some cases, a chroma of the composite ink at a given thickness of the composite ink is within about 20% of a maximum chroma of the colorant in the composite ink. Moreover, the colorant of a composite ink described herein can be a particulate pigment or a molecular dye. Further, in some embodiments, the carrier ink of a composite ink described herein has an optical transparency of at least about 70% transmission, at least about 80% transmission, or at least about 90% transmission between 350 nm and 750 nm, all at a given thickness, such as a thickness between about 0.01 and 10 mm. Additionally, in some instances, a composite ink described herein further comprises one or more additives selected from the group consisting of photoinitiators, inhibitors, stabilizing agents, sensitizers, and combinations thereof.

These and other embodiments are described in greater detail in the detailed description which follows.

BRIEF DESCRIPTION OF THE DRAWINGS

FIG. 1 illustrates schematically a 3D printed article formed according to a method of the prior art.

FIG. 2 illustrates schematically a 3D printed article formed according to a method of the prior art.

FIG. 3 illustrates a look-up table suitable for use in a method of printing a 3D article according to some embodiments described herein.

DETAILED DESCRIPTION

Figure 4:
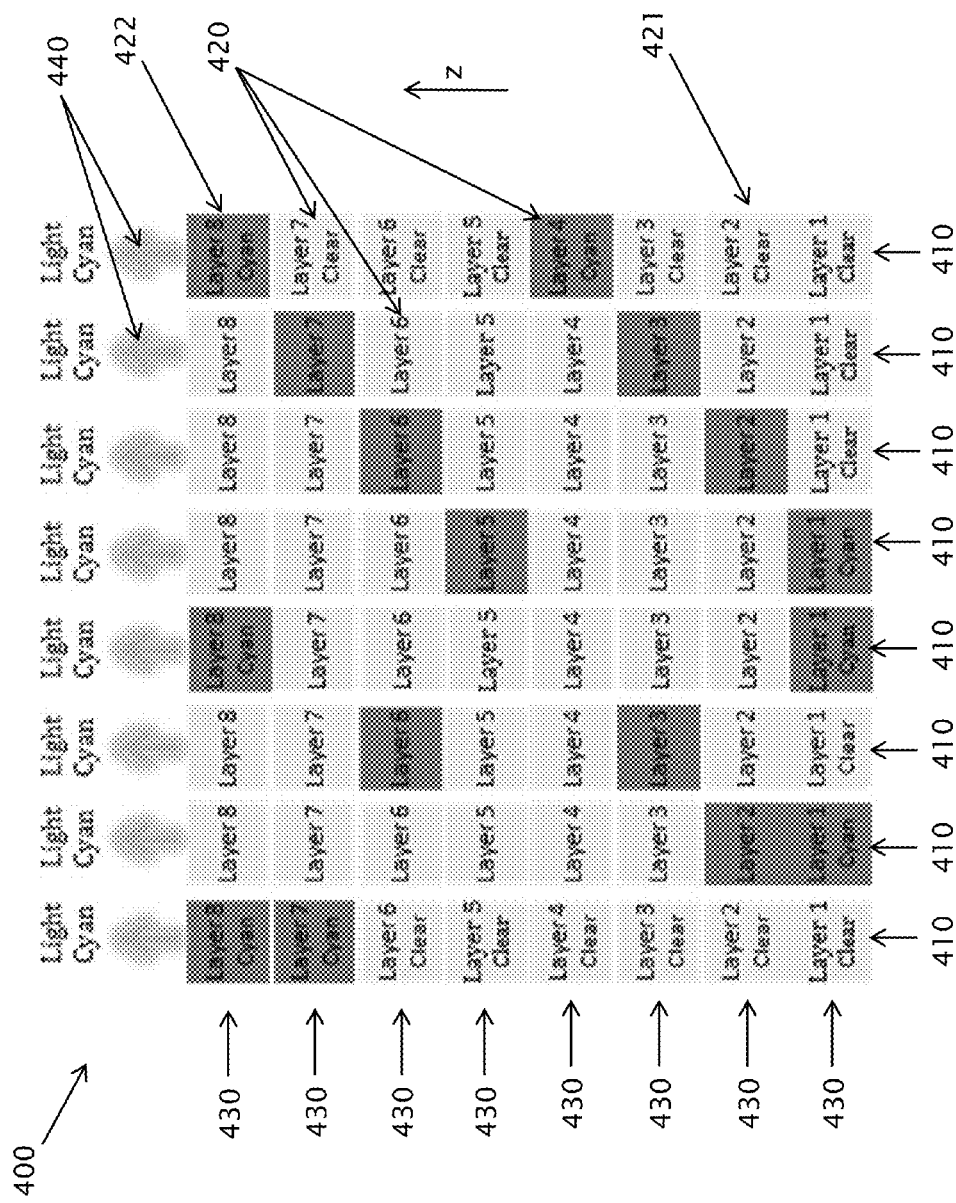
FIG. 4 illustrates schematically a sectional view of an article according to one embodiment described herein.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

I. Methods of Printing a 3D Article

In one aspect, methods of printing a color 3D article are described herein which, in some embodiments, may provide one or more advantages over some previous methods of printing a 3D article. In some cases, a method of printing described herein can be carried out using a printing system such as a ProJet™ 3D Printer manufactured by 3D Systems. However, other 3D printing systems may also be used, and 3D colorization methods described herein are not limited to the use of a specific 3D printing system.

As described hereinabove, prior methods of printing 3D articles fail to provide 3D articles having variation in voxel color with depth from the surface of the articles, thus limiting the colorization of 3D printed parts. For example, some prior methods include providing layers of colored material with no variation in color with depth. In addition, such layers are often formed with an opaque build material having a single color. FIG. 1 and FIG. 2 illustrate two examples of printed articles formed according to these prior methods. With reference to FIG. 1, a printed article (100) includes colored pixels or voxels (denoted in FIG. 1 as C, M, Y, and K for a CMYK colorization scheme) having a depth of only one voxel in the z-direction (depth denoted as $d_z$). With reference to FIG. 2, a printed article (200) includes three sets of colored voxels (denoted in FIG. 2 as G, K, and O for green, black, and orange, respectively). The colored region has a depth in the z-direction of four voxels ($d_z$), but the color of the voxels (G, K, O) does not vary in the z-direction. In contrast to prior methods, methods described in the present disclosure can provide 3D printed articles having a surface colorization in which the observed color results from a combination of color values and/or other visual effects of voxels in three dimensions.

In some embodiments, such a method comprises receiving data representing the surface colorization of the article and transforming the data representing the surface colorization of the article into voxel data of the article, the voxel data comprising (a) location values and at least one of (b) color values and (c) transparency values for a plurality of columns of voxels normal or substantially normal to a surface of the article. The method further comprises selectively depositing layers of one or more build materials onto a substrate to form the article in accordance with the voxel data.

Turning now to specific steps of methods described herein, methods of printing a 3D article described herein include receiving data representing the surface colorization of the article. The "surface colorization" of an article, for reference purposes herein, can be a color pattern or arrangement of colors or colored pixels on a surface. In some cases, the surface colorization is described by a two-dimensional plot or map of pixels having specific colors. Moreover, the specific colors can be assigned based on any color gamut not inconsistent with the objectives of the present disclosure. For example, in some cases, the colors of a surface colorization plot are colors in a RGB, sRGB, CMY, CMYK, L*a*b*, or Pantone® colorization scheme, or a colorization scheme based on one or more of the foregoing, such as an expanded CMYK colorization scheme including green and orange. Moreover, the surface colorization of an article described herein can correspond to colorization perceived by the ordinary human eye or other detector of color when the surface of the article is observed. Additionally, the surface colorization of an article described herein can include visual effects or color effects such as halftoning or dithering of colors. The surface colorization of an article described herein may also be a discrete or pixelated colorization or a continuous colorization.

Further, data representing the surface colorization of an article can be generated and/or received in any manner not inconsistent with the objectives of the present disclosure. In some embodiments, for instance, the data is received from a computer that is part of a 3D printing system. The computer can include a processor and a memory storing computer-readable program code portions that, in response to execution by the processor, cause instructions to be provided to one or more components of the 3D printing system for carrying out a method described herein. Further, the data representing the surface colorization of the article can be part of an image of the article in a computer readable format, such as a computer assisted design (CAD) format. Other formats may also be used. The data representing the surface colorization may also be provided as a separate image (including a separate image in a computer readable format), separate from an uncolored image of the article. Moreover, it is also possible, in some cases, to receive the data representing the surface colorization of an article from a camera or other image scanner. Surface colorization data may be received in other manners as well, and the scope of the present disclosure is not necessarily limited to a specific manner in which surface colorization data is received. Further, the surface colorization data may be received prior to, simultaneous with, or after one or more rendering or slicing steps are carried out.

Methods described herein also comprise transforming surface colorization data into voxel data. Further, the voxel data comprises (a) location values and at least one of (b) color values and (c) transparency values for a plurality of columns of voxels normal or substantially normal to a surface of the article. A "column" of voxels, as described further herein, can refer to a stack of single voxels disposed one on top of the other in a z-direction normal or substantially normal to a surface of the article proximate the column of voxels. A direction that is "substantially" normal or perpendicular to a surface, plane, or to another direction, for reference purposes herein, is within about 15 degrees, within about 10 degrees, or within about 5 degrees of the normal direction.

"Location" values for a column of voxels can comprise three-dimensional coordinate values for the center of one or more voxels within the column. Typically, the location values for a column of voxels include coordinate values for every voxel in the column. The location values can be in any format not inconsistent with the objectives of the present disclosure. For example, the location values can be (x, y, z) values corresponding to the centers of the voxels of the column. Additionally, at least some location values for a column of voxels can be relative to other voxels in the column. For instance, in some cases, the location values include an ordering of "layers" of voxels in the column in the z-direction. Other location values may also be used.

Similarly, "color" values for a column of voxels can comprise color values for one voxel or more than one voxel within the column. Typically, the color values for a column of voxels include color values for all of the voxels in the column. In addition, the color values can be color values according to any colorization scheme not inconsistent with the objectives of the present disclosure, such as a RGB, sRGB, CMY, CMYK, L*a*b*, or Pantone® colorization scheme. Moreover, the color values, in some cases, are color values in the same colorization scheme as the data representing the surface colorization of the article. In other instances, the color values are in a different colorization scheme than the data representing the surface colorization of the article.

"Transparency" values for a column of voxels can comprise transparency values for one voxel or more than one voxel within the column. Typically, the transparency values for a column of voxels include transparency values for all of the voxels in the column. In addition, the transparency values can be transparency values according to any transparency-denoting scheme not inconsistent with the objectives of the present disclosure. For example, in some cases, transparency values are values between 0 (full transparency) and 1 (full opacity) on an "alpha" scale. Transparency values of voxel data can also correspond to the optical transparency of the voxel (or the material used to form the voxel) to light having a wavelength between about 350 nm and about 750 nm. For example, a voxel may have an optical transparency of less than about 30% transmission, less than about 50% transmission, less than about 70% transmission, greater than about 70% transmission, greater than about 80% transmission, greater than about 90% transmission, about 70-80% transmission, about 80-90% transmission, or about 90-100% transmission of incident light between 350 nm and 750 nm over the thickness of the voxel or over some other given thickness, such as a thickness between about 0.01 and 10 mm, between about 0.2 and 1 mm, between about 0.3 and 0.8 mm, between about 1 and 10 mm, between about 1 and 5 mm, or between about 5 and 10 mm.

As described further hereinbelow, transforming surface colorization data described herein into voxel data described herein can permit a desired surface appearance of the article to be achieved by printing voxels of build material or other material corresponding to the voxel data. Moreover, surface colorization data can be transformed into voxel data in any manner not inconsistent with the objectives of the present disclosure. For instance, in some cases, surface colorization data is transformed into voxel data by mapping n voxels having various location, color, and transparency values into columns of voxels in such a manner as to provide a desired observed color or color output from each column of voxels. In some embodiments, surface colorization data is transformed into voxel data using a look-up table. FIG. 3 illustrates a portion of one non-limiting example of a look-up table that may be used for transforming surface colorization data into voxel data. With reference to FIG. 3, RGB color values for various red tints are provided in the partial look-up table as "requested 3D part colors." These "requested" part colors can correspond to a color "requested" in a particular location to provide a specific surface colorization of the article. For each "requested" tint in the table, a column of voxels having 8 layers is provided that would produce the desired tint of red. In the portion of the look-up table illustrated in FIG. 3, "M" represents a translucent magenta voxel, "Y" represents a translucent yellow voxel, and "CL" represents a translucent non-colored (or "clear") voxel. A "translucent" voxel, in some embodiments, can refer to a voxel having a transparency value corresponding to at least about 30%, at least about 40%, at least about 50%, at least about 60%, at least about 70%, at least about 80%, at least about 85%, or at least about 90% transmission of incident light between 350 nm and 750 nm at a voxel thickness or optical path length of 0.2-1 mm, 0.3-0.8 mm, or 1-5 mm. The location values for the voxels in the z-direction are represented by the layer designations. For example, a voxel in Layer 1 is farther from the article surface in the z-direction than a voxel in Layer 2, such that Layer 2 is disposed "over" Layer 1. The location values for the voxels in the x- and y-directions are assumed to be identical for a given column of voxels, such that the voxels are perfectly or substantially perfectly aligned in the xy-plane.

Again with reference to FIG. 3, the look-up table can be used in a method described herein as follows. If, for instance, surface colorization data calls for a color in a specific location having RGB color values of R=255, G=0, and B=0, this portion of the surface colorization data can be transformed into voxel data corresponding to a column of voxels having 8 layers of stacked voxels, wherein the layers comprise voxels having translucent transparency values and alternating magenta and yellow color values, as shown in the first row of the look-up table illustrated in FIG. 3. Other RGB color values can be obtained in a similar manner. In the event that surface colorization data calls for a color having color values that are not precisely provided for in the look-up table, the called-for color can be mapped to the closest color available in the look-up table. Further, it is to be understood that the table of FIG. 3 is a partial table, and that additional colors and tints may also be included in a look-up table similar to that illustrated in FIG. 3.

Moreover, in some cases, a look-up table can include more than one set of voxel data for a specific "requested 3D part color." For example, FIG. 4 illustrates a portion of an article (400) comprising a plurality of columns (410) of voxels (420), each column (410) including 8 layers (430) of voxels (420) and each column (410) producing the same surface color value (440). In the embodiment of FIG. 4, each column (410) of voxels (420) provides a light cyan surface color (440, represented as a plume of observed color) through the combination of "clear" voxels (421, represented as lighter squares) and translucent cyan-colored voxels (422, represented as darker squares). The placement of the clear voxels (421) vary among the columns (410), in one instance being disposed beneath the cyan voxels (422), in one instance being disposed above the cyan voxels (422), in one instance being disposed between the cyan voxels (422), and in other cases being disposed in a combination of the foregoing positions. In general, it should be noted that a "clear" voxel described herein can be used to "fill in the blanks" of a dithering and/or halftoning pattern in the z-direction, where the pattern itself is defined by colored voxels. For instance, if a desired dithering or halftoning pattern calls for only three colored voxels to provide a desired surface color, then any remaining voxels within the column (e.g., four remaining voxels in a 7-layer column) can be clear voxels.

In some embodiments described herein, adjacent columns of voxels providing the same surface color have differing combinations of voxels in the z-direction (such as shown in FIG. 4). Providing the same color with differing arrangements of voxels in adjacent columns of voxels may, in some cases, reduce or eliminate the perception of high frequency patterning. More generally, the arrangement of voxels in a specific column used to provide a desired surface color can be selected based on achieving or avoiding a specific visual effect, such as a high frequency patterning effect or a shimmering effect.

In addition, as illustrated in FIG. 4, the 3D printed article (400) is depicted in a sectional view. It is to be understood that columns (410) of voxels (420) can also be present in sections or slices of the article (410) not depicted.

In general, columns of voxels described herein can comprise any desired combination of individual voxels not inconsistent with the objectives of the present disclosure. As described above, the characteristics and arrangement of voxels within a column or within a plurality of columns can provide different surface colors or other visual effects to a specific surface pixel or to a larger region of a surface. In some cases, at least one column of voxels includes voxels having different color values and/or different transparency values. Moreover, in some embodiments, a plurality of columns of voxels includes voxels having different color values and/or different transparency values compared to other voxels within the column. For example, in some instances, one or more columns of voxels include both translucent voxels and opaque voxels. An opaque voxel, in some embodiments, transmits no more than about 10%, no more than about 20%, or no more than about 30% of incident light through the voxel or through a given thickness (such as 0.01-10 mm, 0.1-1 mm, or 1 cm) of the material used to form the opaque voxel. In some cases, an opaque voxel transmits less than about 5% of incident light through the voxel or over a given thickness or path length (such as 0.01-10 mm, 0.1-1 mm, or 1 cm) of the material used to form the voxel. Further, the incident light can comprise visible light, such as light having a wavelength from about 350 nm to about 750 nm, from about 400 nm to about 700 nm, from about 450 nm to about 500 nm, from about 450 nm to about 550 nm, from about 500 nm to about 570 nm, from about 500 nm to about 600 nm, from about 600 nm to about 650 nm, from about 600 nm to about 700 nm, or from about 650 nm to about 750 nm. Additionally, in some embodiments, one or more columns of voxels include colored voxels and non-colored voxels. As described further hereinbelow, a colored voxel can be formed from a build material comprising one or more colorants. Similarly, a non-colored voxel can be formed from a build material that does not include a colorant.

Further, in some cases, a column of voxels can comprise a plurality of colored voxels having the same color value. In such an instance, the plurality of colored voxels can be combined to achieve a desired color saturation. For instance, in some embodiments, 12 voxels within the same column of voxels can each provide $1/12^{th}$ of the desired color saturation for the surface color exhibited by the column. Other distributions of color saturation within voxels of a column are also possible. In general, to achieve a color saturation of n, a plurality of voxels can be combined in a column, wherein the plurality of voxels each contributes a color saturation of less than n, such as a color saturation of 1/n. In this manner, a desired, stronger color saturation can be achieved by stacking lighter colored or less saturated voxels in a column in a manner described herein.

Additionally, a column of voxels can comprise a plurality of voxels, included colored voxels, having the same or substantially the same location values in the x- and y-directions but differing location values in the z-direction. Such voxels in a column can thus be aligned or substantially aligned in the x- and y-directions and stacked in the z-direction. Voxels that are "substantially" aligned in the x- and y-directions, for reference purposes herein, can have x and y values (for the centers of the voxels) that differ by less than 0.5 voxel lengths, less than 0.3 voxel lengths, less than 0.2 voxel lengths, less than 0.1 voxel lengths, less than 0.05 voxel lengths, or less than 0.01 voxel lengths in each of the x- and y-directions, where the "voxel length" in the x- and y-directions is the average size of the voxels of the column in the x- and y-directions, respectively. In some instances, substantially aligned voxels differ by 0-0.4 voxel lengths, 0-0.2 voxel lengths, 0-0.1 voxel lengths, 0.01-0.15 voxel lengths, 0.01-0.1 voxel lengths, or 0.01-0.05 voxel lengths in the x- and y-directions. Columns comprising such aligned or substantially voxels, in some cases, can provide surface colors having improved color fidelity and/or improved color uniformity.

As described hereinabove, at least one column of a plurality of columns of voxels can exhibit a surface color resulting from a combination of colors of a plurality of voxels of the column. In some cases, more than one column of voxels exhibits a surface color resulting from a combination of colors of a plurality of voxels of the column. Further, the plurality of columns of voxels (through the combination, mixing, dithering, and/or halftoning of colors in the x, y, and z dimensions) can provide an appearance to a surface of the 3D printed article that corresponds to the surface colorization data of the article. Moreover, in such cases, the color match between the surface color provided by a given column of voxels (or by a plurality of columns of voxels) and the corresponding surface colorization of the article can be high. Color match, in some cases, can be an in-gamut color match or a color match based on an International Color Consortium (ICC) profile or standard or ICC transformation. A color match may also be based on a SWOP (Specifications for Web Offset Publications) specification. Further, in some embodiments described herein, different colored voxels and/or build materials used to form the voxels can provide a wide color gamut.

In some instances, a plurality of columns of voxels described herein defines a color skin region of the article. Such a "color skin" region can be a region of the article proximate the surface of the article that provides a desired colorization, color pattern, or other visual effect. Moreover, a color skin region of an article described herein can be formed from one or more build materials comprising one or more colorants, as described further herein.

A color skin region of an article described herein can have any depth or thickness not inconsistent with the objectives of the present disclosure. In some instances, a color skin region has a depth or thickness of at least two voxels in the z-direction. In some cases, a color skin region has a depth or thickness of 2-32 voxels, 2-24 voxels, 2-16 voxels, 4-32 voxels, 4-24 voxels, or 4-16 voxels. Other depths or thicknesses are also possible. Further, in some cases, the total depth or thickness of the color skin region is between about 0.03 mm and about 3 mm, between about 0.05 mm and about 2.5 mm, or between about 0.05 mm and about 2 mm. The thickness or depth of a color skin region described herein can be selected based on a desired color level and/or a desired color profile of the article in the z-direction.

In addition, in some embodiments, a color skin region described herein is formed over an opacity skin region of the article. It is to be understood that a color skin region of an article that is formed "over" another region of the article, such as an opacity skin region, is positioned closer to the surface of the article in a z-direction normal or substantially normal to the surface. Moreover, in some cases, an opacity skin region can comprise a continuous opaque region within the interior of the article. Such an opacity skin region can be formed from a plurality of opaque voxels, including a plurality of continuous opaque voxels, such as a continuous layer or shell of opaque voxels. Further, the opacity skin region of an article, when present, can have any desired depth or thickness not inconsistent with the objectives of the present disclosure. In some cases, an opacity skin region has a depth or thickness of at least two voxels in the z-direction. In some instances, an opacity skin region has a depth or thickness of 2-32 voxels, 2-24 voxels, 2-16 voxels, 4-32 voxels, 4-24 voxels, or 4-16 voxels. The formation of an opacity skin region according to a method described herein, in some embodiments, can provide a generally opaque 3D printed article that nevertheless exhibits surface colorization based on a combination of voxels in the z-direction in a manner described herein.

Similarly, in some embodiments, a color skin region described herein is formed over a reflective skin region of the article. A reflective skin region can comprise a continuous reflective region within the interior of the article, where a "reflective" region reflects at least about 20%, at least about 30%, at least about 50%, or at least about 70% of incident radiation, including at visible wavelengths of light. Such a reflective skin region can be formed from a plurality of reflective voxels, including a plurality of continuous reflective voxels, such as a continuous layer or shell of reflective voxels. Further, the reflective skin region of an article, when present, can have any desired thickness not inconsistent with the objectives of the present disclosure. In some cases, a reflective skin region has a thickness of at least two voxels in the z-direction. In some instances, a reflective skin region has a thickness of 2-32 voxels, 2-24 voxels, 2-16 voxels, 4-32 voxels, 4-24 voxels, or 4-16 voxels.

In addition, it is also possible, in some cases, for a color skin region of an article to be formed over an interior region of the article that is not an opacity skin region or a reflective skin region. However, like an opacity skin region or reflective skin region, the color and/or transparency of an interior region of an article can affect the surface appearance of the article. For example, in some instances, the interior region of an article is black in color or white in color, resulting in a darkening or lightening effect, respectively, of the colorization of the overlying color skin region. The interior region can also be non-colored. Further, the interior region can be opaque or translucent, as desired. It is to be understood that an interior region of an article can be formed from voxels that are not part of the color skin region, opacity skin region, or reflective skin region. In addition, in some cases, the interior region is at least 0.5 mm, at least 1 mm, at least 2 mm, at least 3 mm, or at least 4 mm beneath the exterior surface of the article.

Aspects of the present disclosure have been described herein with reference to voxels. It is to be understood that a "voxel" described herein can be any desired size, as desired or needed for a given visual effect, provided the 3D printing system used to form the voxel is capable of providing voxels of the desired size. The size of a voxel can also correspond to a volume of build material associated with a printing resolution or feature resolution of a 3D printing system used to carry out a method described herein. The "feature resolution" of an article or system, for reference purposes herein, can be the smallest controllable physical feature size of the article. The feature resolution of an article can be described in terms of a unit of distance such as microns (μm), or in terms of dots per inch (dpi). As understood by one of ordinary skill in the art, a higher feature resolution corresponds to a higher dpi value but a lower distance value in μm. In some cases, an article formed by a method described herein can have a feature resolution of about 500 μm or less, about 200 μm or less, about 100 μm or less, or about 50 μm or less. In some embodiments, an article has a feature resolution between about 50 μm and about 500 μm, between about 50 μm and about 200 μm, between about 50 μm and about 100 μm, or between about 100 μm and about 200 μm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi. In some instances, a voxel described herein has a volume corresponding to the product of the feature resolution (in distance units such as microns) and the layer thickness provided by the 3D printing system. In some embodiments, one or more layers of build material have a thickness of about 0.03 to about 5 mm, a thickness of about 0.03 to about 3 mm, a thickness of about 0.03 to about 1 mm, a thickness of about 0.03 to about 0.5 mm, a thickness of about 0.03 to about 0.3 mm, a thickness of about 0.03 to about 0.2 mm, a thickness of about 0.05 to about 5 mm, a thickness of about 0.05 to about 1 mm, a thickness of about 0.05 to about 0.5 mm, a thickness of about 0.05 to about 0.3 mm, or a thickness of about 0.05 to about 0.2 mm. Other thicknesses are also possible.

Methods of printing a 3D article described herein comprise selectively depositing layers of one or more build materials onto a substrate to form the article in accordance with voxel data generated by the method. Layers of one or more build materials can be deposited in any manner not inconsistent with the objectives of the present disclosure. In addition, any build materials not inconsistent with the objectives of the present disclosure may be used in a method described herein.

In some instances, at least one build material used to form an article in a manner described herein is optically transparent or substantially optically transparent, including at visible wavelengths of light. A "substantially" optically transparent build material, for reference purposes herein, has an optical transparency of at least about 70% transmission for a given wavelength or wavelength range at a given thickness, such as a thickness of about 0.01 to 10 mm, about 0.2 to 1 mm, about 0.3 to 0.8 mm, about 1 to 10 mm, about 1 to 5 mm, or about 5 to 10 mm. In some embodiments, a build material described herein has an optical transparency of at least about 80% transmission, at least about 90% transmission, or least about 95% transmission between about 350 nm and about 750 nm, at a given thickness, such as a thickness of about 0.01 to 10 mm, about 0.2 to 1 mm, about 0.3 to 0.8 mm, about 1 to 10 mm, about 1 to 5 mm, or about 5 to 10 mm. In some cases, a build material has a transparency of at least about 98% or at least about 99% transmission between about 350 nm and about 750 nm, at a given thickness, such as a thickness of about 0.01 to 10 mm, about 0.2 to 1 mm, about 0.3 to 0.8 mm, about 1 to 10 mm, about 1 to 5 mm, or about 5 to 10 mm. Moreover, in some instances, a build material described herein has an optical transparency between about 70% and about 95%, between about 80% and about 99.99%, or between about 90% and about 95% transmission at wavelengths between about 350 nm and about 750 nm, at a given thickness, such as a thickness of 0.1 to 10 mm, about 0.2 to 1 mm, about 0.3 to 0.8 mm, about 1 to 10 mm, about 1 to 5 mm, or about 5 to 10 mm.

Non-limiting examples of build materials suitable for use in some embodiments of methods described herein are provided in Section II hereinbelow. Other build materials may also be used. In some cases, a build material comprises a glass or plastic material, such as a sintered or melted glass or plastic. Moreover, such build materials can be colored build materials comprising one or more colorants, such as one or more colorants described in Section II hereinbelow.

Further, in some embodiments, a plurality of differently colored build materials are used to form a 3D printed article according to a method described herein. Moreover, in some cases, a relatively small number of differently colored build materials can be used for full-color 3D printing according to a method described herein, where "full-color" 3D printing can include 3D printing of articles having colors that span all or substantially all of the color gamut of a given colorization scheme such as a colorization scheme described hereinabove. In some instances, full-color printing can be achieved using a method described herein using 3, 4, 5, 6, 7, or 8 differently colored build materials. In some cases, more than 8 differently colored build materials are used. In some embodiments, two differently colored build materials are used in a method described herein. In some embodiments using a plurality of differently colored build materials, the different build materials are used to individually form individual voxels described herein.

Further, the layers of build material can be deposited according to an image of the 3D article in a computer readable format. In some embodiments, the build material is deposited according to preselected computer aided design (CAD) parameters. Moreover, in some cases, one or more layers of build material described herein have a thickness of about 0.03 to about 5 mm, a thickness of about 0.03 to about 3 mm, a thickness of about 0.03 to about 1 mm, a thickness of about 0.03 to about 0.5 mm, a thickness of about 0.03 to about 0.3 mm, a thickness of about 0.03 to about 0.2 mm, a thickness of about 0.05 to about 5 mm, a thickness of about 0.05 to about 1 mm, a thickness of about 0.05 to about 0.5 mm, a thickness of about 0.05 to about 0.3 mm, or a thickness of about 0.05 to about 0.2 mm. Other thicknesses are also possible.

Further, in some cases, the substrate of a method described herein comprises a build pad of a 3D printing system. The substrate of a method described herein can also comprise a previous layer of deposited material.

Additionally, it is to be understood that methods of printing a 3D article described herein can include so-called "multijet" 3D printing methods. For example, in some instances, a multijet method of printing a 3D article comprises selectively depositing layers of one or more build materials described herein in a fluid state onto a substrate, such as a build pad of a 3D printing system. In addition, in some embodiments, a method described herein further comprises supporting at least one of the layers of the one or more build materials with a support material. Any support material not inconsistent with the objectives of the present disclosure may be used.

When a curable build material is used, a method described herein can also comprise curing the layers of the one or more build materials. For example, in some instances, a method of printing a 3D article described herein further comprises subjecting the one or more build materials to electromagnetic radiation of sufficient wavelength and intensity to cure the one or more build materials, where curing can comprise polymerizing one or more polymerizable moieties or functional groups of one or more components of the one or more build materials. In some cases, a layer of deposited build material is cured prior to the deposition of another or adjacent layer of build material.

Further, in some embodiments, a preselected amount of one or more build materials described herein is heated to the appropriate temperature and jetted through the print head or a plurality of print heads of a suitable inkjet printer to form a layer on a print pad in a print chamber. In some cases, each layer of build material is deposited according to the preselected CAD parameters. A suitable print head to deposit one or more build materials, in some embodiments, is a piezoelectric print head. Additional suitable print heads for the deposition of one or more build materials and support material described herein are commercially available from a variety of ink jet printing apparatus manufacturers. For example, Xerox, Hewlett Packard, or Ricoh print heads may also be used in some instances.

Additionally, in some embodiments, one or more build materials described herein remain substantially fluid upon deposition. Alternatively, in other instances, a build material exhibits a phase change upon deposition and/or solidifies upon deposition. Moreover, in some cases, the temperature of the printing environment can be controlled so that the jetted droplets of a build material solidify on contact with the receiving surface. In other embodiments, the jetted droplets of a build material do not solidify on contact with the receiving surface, remaining in a substantially fluid state. Additionally, in some instances, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted build material described herein prior to curing, in some embodiments, should desirably be sufficient to retain its shape and not be subject to excessive viscous drag from the planarizer.

Moreover, a support material, when used, can be deposited in a manner consistent with that described hereinabove for the one or more build materials. The support material, for example, can be deposited according to the preselected CAD parameters such that the support material is adjacent or continuous with one or more layers of build material. Jetted droplets of the support material, in some embodiments, solidify or freeze on contact with the receiving surface. In some cases, the deposited support material is also subjected to planarization.

Layered deposition of the one or more build materials and support material can be repeated until the 3D article has been formed. In some embodiments, a method of printing a 3D article further comprises removing the support material from the one or more build materials.

II. Build Materials for 3D Printing

In another aspect, build materials for use with a 3D printer and/or in a method of printing 3D articles are described herein. Such build materials, in some instances, are jettable build materials suitable for use with a multijet 3D printing method and/or system. Additionally, in some embodiments, a build material comprises a composite ink. A composite ink described herein, in some cases, comprises an optically transparent or substantially transparent carrier ink comprising a curable material; and a colorant dispersed in the carrier ink in an amount of about 0.01 to 5 weight %, based on the total weight of the composite ink. In some embodiments, the colorant is present in the carrier ink in an amount between about 0.01 and 3 weight %, between about 0.01 and 1 weight %, between about 0.05 and 5 weight %, between about 0.05 and 3 weight %, between about 0.05 and 1 weight %, between about 0.1 and 5 weight %, between about 0.1 and 3 weight %, or between about 0.1 and 1 weight %.

Further, in some cases, a chroma of the composite ink at a given thickness of the composite ink is within about 20%, within about 15%, within about 10%, or within about 5% of a maximum chroma of the colorant in the composite ink. The "chroma" of a composite ink or colorant, for reference purposes herein, refers to the radial component of the polar coordinates of the color of the composite ink or colorant in chromaticity space, such as the CIE 1931 chromaticity space. Further, in some embodiments, a maximum chroma of a composite ink or colorant can be a function of the thickness of the composite ink, including the thickness of a layer formed by the composite ink in a manner described herein. Thus, in some embodiments, the colorant loading of a composite ink described herein can be selected to maximize the chroma of the composite ink, including for a specific desired layer thickness of the composite ink.

Moreover, the colorant of a composite ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of a composite ink comprises an inorganic pigment, such as $TiO_2$ and ZnO. In some embodiments, the colorant of a composite ink comprises a colorant for use in a RGB, sRGB, CMY, CMYK, L*a*b*, or Pantone® colorization scheme. Moreover, in some cases, a particulate colorant described herein has an average particle size of less than 500 nm, such as an average particle size of less than 400 nm, less than 300 nm, less than 250 nm, less than 200 nm, or less than 150 nm. In some instances, a particulate colorant has an average particle size of 50-1000 nm, 50-500 nm, 50-400 nm, 50-300 nm, 50-200 nm, 70-500 nm, 70-300 nm, 70-250 nm, or 70-200 nm.

Further, in some embodiments, the carrier ink of a composite ink described herein can have a high optical transparency, including in the visible region of the electromagnetic spectrum. In some cases, for instance, the carrier ink has an optical transparency of at least about 70% transmission, at least about 80% transmission, at least about 90% transmission, or at least about 95% transmission between about 350 nm and about 750 nm, at a given thickness, such as a thickness of about 0.01 to 10 mm, about 0.2 to 1 mm, about 0.3 to 0.8 mm, about 1 to 10 mm, about 1 to 5 mm, or about 5 to 10 mm. In some cases, a carrier ink has a transparency of at least about 98% or at least about 99% transmission between about 350 nm and about 750 nm, at a given thickness, such as a thickness of about 0.01 to 10 mm, about 0.2 to 1 mm, about 0.3 to 0.8 mm, about 1 to 10 mm, about 1 to 5 mm, or about 5 to 10 mm. Moreover, in some instances, a carrier ink described herein has an optical transparency between about 70% and about 95%, between about 80% and about 99.99%, or between about 90% and about 95% transmission at wavelengths between about 350 nm and about 750 nm, at a given thickness, such as a thickness of 0.1 to 10 mm, about 0.2 to 1 mm, about 0.3 to 0.8 mm, about 1 to 10 mm, about 1 to 5 mm, or about 5 to 10 mm. Carrier inks having an optical transparency described herein can facilitate use of the composite inks in 3D printing colorization processes wherein the perceived color of a 3D printed article is based on the dithering or halftoning of discrete colors in the z-direction of the part, which is orthogonal to the surface of the part, rather than in the x- and y-directions along the surface of the part.

In addition, carrier inks described herein comprise a curable material. The curable material can be present in the carrier ink in any amount not inconsistent with the objectives of the present disclosure. In some cases, the curable material is present in an amount up to about 99 weight %, up to about 95 weight %, up to about 90 weight %, or up to about 80 weight %, based on the total weight of the carrier ink. In some cases, a composite ink described herein comprises about 10-95 weight % curable material, based on the total weight of the carrier ink. In some embodiments, a carrier ink comprises about 20-80 weight % curable material, about 30-70 weight % curable material, or about 70-90 weight % curable material.

Moreover, any curable material not inconsistent with the objectives of the present disclosure may be used. In some cases, a curable material comprises one or more polymerizable components. A "polymerizable component," for reference purposes herein, comprises a component that can be polymerized or cured to provide a 3D printed article or object. Polymerizing or curing can be carried out in any manner not inconsistent with the objectives of the present disclosure. In some embodiments, for instance, polymerizing or curing comprises irradiating with electromagnetic radiation having sufficient energy to initiate a polymerization or cross-linking reaction. For instance, in some embodiments, ultraviolet (UV) radiation can be used.

Further, any polymerizable component not inconsistent with the objectives of the present disclosure may be used. In some embodiments, a polymerizable component comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some embodiments, comprises a free radical polymerization, such as that between points of unsaturation, including points of ethylenic unsaturation. In some embodiments, a polymerizable component comprises at least one ethyleneically unsaturated moiety, such as a vinyl group or allyl group. In some embodiments, a polymerizable component comprises an oligomeric chemical species capable of undergoing additional polymerization, such as through one or more points of unsaturation as described herein. In some embodiments, a polymerizable component comprises one or more monomeric chemical species and one or more oligomeric chemical species described herein. A monomeric chemical species and/or an oligomeric chemical species described herein can have one polymerizable moiety or a plurality of polymerizable moieties.

In some embodiments, a polymerizable component comprises one or more photo-polymerizable or photo-curable chemical species. A photo-polymerizable chemical species, in some embodiments, comprises a UV-polymerizable chemical species. In some embodiments, a polymerizable component is photo-polymerizable or photo-curable at wavelengths ranging from about 300 nm to about 400 nm. Alternatively, in some embodiments, a polymerizable component is photo-polymerizable at visible wavelengths of the electromagnetic spectrum.

In some embodiments, a polymerizable component described herein comprises one or more species of (meth) acrylates. As used herein, the term "(meth)acrylate" includes acrylate or methacrylate or mixtures or combinations thereof. In some embodiments, a polymerizable component comprises an aliphatic polyester urethane acrylate oligomer, a urethane(meth)acrylate resin, and/or an acrylate amine oligomeric resin, such as EBECRYL 7100. In some embodiments, a UV polymerizable or curable resin or oligomer can comprise any methacrylate or acrylate resin which polymerizes in the presence of a free radical photoinitiator, is thermally stable in an exposed state for at least one week at a jetting temperature and for at least 4 weeks in an enclosed state, and/or has a boiling point greater than the jetting temperature. In some embodiments, a polymerizable component has a flash point above the jetting temperature.

Urethane(meth)acrylates suitable for use in inks described herein, in some embodiments, can be prepared in a known manner, typically by reacting a hydroxyl-terminated urethane with acrylic acid or methacrylic acid to give the corresponding urethane(meth)acrylate, or by reacting an isocyanate-terminated prepolymer with hydroxyalkyl acrylates or methacrylates to give the urethane(meth)acrylate. Suitable processes are disclosed, inter alia, in EP-A 114 982 and EP-A 133 908. The weight average molecular weight of such (meth)acrylate oligomers is generally in the range from about 400 to 10,000, or from about 500 to 7,000. Urethane (meth)acrylates are also commercially available from the SARTOMER Company under the product names CN980, CN981, CN975 and CN2901, or from Bomar Specialties Co. (Winsted, Conn.) under the product name BR-741. In some embodiments described herein, a urethane(meth)acrylate oligomer has a dynamic viscosity ranging from about 140,000 cP to about 160,000 cP at about 50° C. or from about 125,000 cP to about 175,000 cP at about 50° C. when measured in a manner consistent with ASTM D2983. In some embodiments described herein, a urethane(meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

In some embodiments, a polymerizable component comprises one or more low molecular weight materials, such as methacrylates, dimethacrylates, triacrylates, and diacrylates, which can be used in a variety of combinations. In some embodiments, for example, a polymerizable component comprises one or more of tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, and tridecyl methacrylate.

In some embodiments, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

A polymerizable component, in some embodiments, comprises one or more tri(meth)acrylates. In some embodiments, tri(meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate.

In some embodiments, a polymerizable component of an ink described herein comprises one or more higher functional acrylates or methacrylates such as dipentaerythritol monohydroxy pentaacrylate or bis(trimethylolpropane)tetraacrylate. In some embodiments, a (meth)acrylate of an ink has a molecular weight ranging from about 250 to 700.

In some embodiments, a polymerizable component comprises allyl acrylate, allyl methacrylate, methyl(meth)acrylate, ethyl(meth)acrylate, n-propyl(meth)acrylate, n-butyl (meth)acrylate, isobutyl(meth)acrylate, n-hexyl(meth) acrylate, 2-ethylhexyl(meth)acrylate, n-octyl(meth)acrylate, n-decyl(meth)acrylate and n-dodecyl(meth)acrylate, 2-hydroxyethyl(meth)acrylate, 1- and 3-hydroxypropyl(meth) acrylate, 2-methoxyethyl(meth)acrylate, 2-ethoxyethyl (meth)acrylate and 2- or 3-ethoxypropyl(meth)acrylate, tetrahydrofurfuryl methacrylate, 2-(2-ethoxyethoxyl)ethyl acrylate, cyclohexyl methacrylate, 2-phenoxyethyl acrylate, glycidyl acrylate, isodecyl acrylate, or a combination thereof.

Additional non-limiting examples of species of polymerizable components useful in some embodiments described herein include the following: isobornyl acrylate (IBOA), commercially available from SARTOMER under the trade name SR 506A; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; and 2-phenoxyethyl acrylate, commercially available from SARTOMER under the trade name SR 339. Other commercially available curable materials may also be used.

Carrier inks described herein, in some embodiments, further comprise one or more additives. In some embodiments, a carrier ink described herein further comprises one or more additives selected from the group consisting of photoinitiators, inhibitors, stabilizing agents, sensitizers, and combinations thereof. For example, in some embodiments, an ink further comprises one or more photoinitiators. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some cases, suitable photoinitiators comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some instances, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some cases, comprises ionic dye-counter ion compounds capable of absorbing actinic radiation and generating free radicals for polymerization initiation. In some embodiments, inks containing ionic dye-counter ion compounds can be cured more variably with visible light within the adjustable wavelength range of about 400 nm to about 700 nm. Some ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 weight percent, based on the total weight of the ink. In some embodiments, a photoinitiator is present in an amount ranging from about 0.1 weight percent to about 5 weight percent.

In some embodiments, an ink further comprises one or more sensitizers. A sensitizer can be added to an ink to increase the effectiveness of one or more photoinitiators that may also be present. Any sensitizer not inconsistent with the objectives of the present disclosure may be used. In some embodiments, a sensitizer comprises isopropylthioxanthone (ITX). In some embodiments, a sensitizer comprises 2-chlorothioxanthone (CTX).

A sensitizer can be present in an ink in any amount not inconsistent with the objectives of the present disclosure. In some embodiments, a sensitizer is present in an amount ranging from about 0.1 weight percent to about 2 weight percent, based on the total weight of the ink. A sensitizer, in some embodiments, is present in an amount ranging from about 0.5 weight percent to about 1 weight percent.

In addition, an ink described herein, in some embodiments, further comprises one or more polymerization inhibitors or stabilizing agents. A polymerization inhibitor can be added to an ink to provide additional thermal stability to the composition. Any polymerization inhibitor not inconsistent with the objectives of the present disclosure may be used. In some cases, a polymerization inhibitor comprises methoxyhydroquinone (MEHQ). A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein.

A polymerization inhibitor and/or a stabilizing agent can be present in an ink in any amount not inconsistent with the objectives of the present disclosure. In some embodiments, a polymerization inhibitor is present in an amount ranging from about 0.1 wt. % to about 2 wt. % or from about 0.5 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

Composite inks described herein can also exhibit a variety of other desirable properties. For example, a composite ink described herein can have any freezing point, melting point, and/or other phase transition temperature not inconsistent with the objectives of the present disclosure. In some embodiments, an ink has freezing and melting points consistent with temperatures used in some 3D printing systems, including 3D printing systems designed for use with phase changing inks. In some embodiments, the freezing point of an ink is greater than about 40° C. In some embodiments, for example, an ink has a freezing point centered at a temperature ranging from about 45° C. to about 55° C. or from about 50° C. to about 80° C. In some embodiments, an ink has a freezing point below about 40° C. or below about 30° C.

Further, in some embodiments described herein, a composite ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, a composite ink described herein, in some cases, is fluid at jetting temperatures encountered in 3D printing systems. Moreover, in some embodiments, an ink solidifies once deposited on a surface during the fabrication of a three-dimensionally printed article or object. Alternatively, in other embodiments, an ink remains substantially fluid upon deposition on a surface. Solidification of an ink, in some embodiments, occurs through a phase change of the ink, such as freezing. The phase change can comprise a liquid to solid phase change or a liquid to semi-solid phase change. Further, in some instances, solidification of an ink comprises an increase in viscosity, such as an increase in viscosity from a low viscosity state to a high viscosity state.

In some embodiments, a composite ink described herein has a viscosity profile consistent with the requirements and parameters of one or more 3D printing systems. In some embodiments, for instance, an ink described herein has a viscosity ranging from about 8.0 cP to about 14.0 cP at a temperature of about 80° C. when measured according to ASTM standard D2983 (e.g., using a Brookfield Model DV-II+ Viscometer). In some embodiments, an ink has a viscosity ranging from about 9.5 cP to about 12.5 cP at a temperature of about 80° C. An ink, in some embodiments, has a viscosity ranging from about 10.5 cP to about 12.5 cP at a temperature of about 80° C. In some embodiments, an ink has a viscosity ranging from about 8.0 cP to about 10.0 cP at a temperature of about 85-87° C.

In some embodiments, a composite ink described herein has a viscosity ranging from about 8.0 cP to about 19.0 cP at a temperature of about 65° C. measured according to ASTM standard D2983. In some embodiments, an ink described herein has a viscosity ranging from about 8.0 cP to about 13.5 cP at a temperature of about 65° C. An ink, in some embodiments, has a viscosity ranging from about 11.0 cP to about 14.0 cP at a temperature of about 65° C. In some embodiments, an ink has a viscosity ranging from about 11.5 cP to about 13.5 cP or from about 12.0 cP to about 13.0 cP at a temperature of about 65° C.

Further, composite inks described herein, in some embodiments, exhibit a combination of one or more desirable features. In some embodiments, for instance, a composite ink in the non-cured state has one or more of the following properties:

1. Freezing point between about 30° C. and about 65° C.;
2. jetting viscosity of about 8 cP to about 16 cP at 70-95° C.; and
3. Thermal stability for at least 3 days at the jetting temperature.

Viscosity can be measured according to ASTM D2983 (e.g., using a Brookfield Model DV-II+ Viscometer). In addition, for reference purposes herein, a "thermally stable" material exhibits no greater than about a 35 percent change in viscosity over a specified time period (e.g., 3 days) when measured at the specified temperature (e.g., a jetting temperature of 85° C.) at the beginning and at the end of the time period. In some embodiments, the viscosity change is no greater than about 30 percent or no greater than about 20 percent. In some embodiments, the viscosity change is between about 10 percent and about 20 percent or between about 25 percent and about 30 percent. Moreover, in some embodiments, the change in viscosity is an increase in viscosity.

Composite inks described herein can also exhibit a variety of desirable properties, in addition to those described hereinabove, in a cured state. A composite ink in a "cured" state, as used herein, comprises an ink that includes a curable material or polymerizable component that has been at least partially polymerized and/or cross-linked. For instance, in some embodiments, a cured ink is at least about 10% polymerized or cross-linked or at least about 30% polymerized or cross-linked. In some embodiments, a cured ink is at least about 50%, at least about 70%, at least about 80%, or at least about 90% polymerized or cross-linked. In some embodiments, a cured ink is between about 10% and about 99% polymerized or cross-linked.

Composite inks described herein, in some embodiments, can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some embodiments, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting. The filtered mixture is then cooled to ambient temperatures until it is heated in the ink jet printer.

III. 3D Printed Articles

In another aspect, 3D printed articles are described herein. 3D printed articles described herein can be formed by a method described hereinabove in Section I and/or using a build material described hereinabove in Section II. For example, in some embodiments, a 3D printed article described herein comprises an interior region and a color skin region disposed over the interior region in a z-direction. The color skin region is formed or defined by a plurality of columns of voxels substantially normal to a surface of the article. Further, in some cases, at least one column of voxels exhibits a surface color resulting from a combination of colors of a plurality of voxels of the column.

The interior region of an article described herein can be the innermost region of the article in the z-direction (which, as described above, is normal or substantially normal to an exterior surface of the article). Further, the interior region of an article can have any color and/or other optical property not inconsistent with the objectives of the present disclosure. In some cases, for instance, the interior region of an article described herein is black in color or white in color. As described above, black-colored interior regions disposed below a color skin region can serve to darken one or more colors exhibited or produced by the color skin region. Other dark colors in addition to black may also be used. Similarly, a white-colored interior region can serve to lighten one or more colors exhibited or produced by the overlying color skin region. Further, light colors other than white may also be used to achieve a similar effect. Moreover, in some instances, the interior region of an article described herein is opaque or optically reflective. An interior region may also be translucent or transparent. In addition, in some embodiments, the interior region of an article described herein is located or begins at least about 0.5 mm, at least about 1 mm, at least about 2 mm, at least about 3 mm, or at least about 4 mm beneath the exterior surface of the article.

As described above in Section I, the color skin region of an article described herein can be formed or defined by a plurality of columns of voxels selected and arranged to provide a desired surface color or other visual surface effect. For instance, in some cases, at least one column of voxels includes voxels having different color values and/or different transparency values. As described above, the use of voxels within a single column having different color values and/or different transparency values can permit the column of voxels to exhibit a wide range of color values and/or other visual effects resulting from the combination of the visual characteristics of the individual voxels of the column. In this manner, full-color colorization schemes, dithering, and/or halftoning can be achieved by varying color in the z-direction of a 3D printed article. In some embodiments, a column of voxels includes translucent voxels and opaque voxels, and/or colored voxels and non-colored voxels. As described above, a colored voxel can be formed from a build material including one or more colorants, and a non-colored voxel can be formed from a build material that does not comprise a colorant or to which one or more colorants have not been intentionally added.

Further, a color skin region of an article described herein can have any depth or thickness not inconsistent with the objectives of the present disclosure. In some cases, a color skin region has a depth or thickness of at least two voxels in the z-direction. In some embodiments, a color skin region has a depth or thickness of 2-32 voxels, 2-24 voxels, 2-16 voxels, 4-32 voxels, 4-24 voxels, or 4-16 voxels. Other depths or thicknesses are also possible. In some cases, the total depth or thickness of the color skin region is between about 0.03 mm and about 3 mm, between about 0.05 mm and about 2.5 mm, or between about 0.05 mm and about 2 mm. The thickness or depth of a color skin region described herein can be selected based on a desired color level and/or a desired color profile of the article in the z-direction.

Moreover, in some cases, a 3D printed article described herein further comprises one or more additional regions disposed between the color skin region and the interior region of the article. For example, in some instances, an article further comprises an opacity skin region and/or a reflective skin region disposed between the color skin region and the interior region of the article in a z-direction. Such an opacity skin region or reflective skin region can have any property and be formed in any manner described hereinabove in Section I for an opacity skin region or reflective skin region. For instance, in some embodiments, an opacity skin region of an article described herein is formed from a plurality of opaque voxels, including a plurality of continuous opaque voxels. Similarly, a reflective skin region, in some cases, is formed from a plurality of reflective voxels such as a plurality of continuous reflective voxels.

In some instances, an opacity skin region and/or a reflective skin region has a thickness of at least two voxels in the z-direction. In some cases, an opacity skin region and/or a reflective skin region has a thickness of 2-32 voxels, 2-24 voxels, 2-16 voxels, 4-32 voxels, 4-24 voxels, or 4-16 voxels. Other thicknesses are also possible. The thickness or depth of an opacity skin region and/or a reflective skin region described herein can be selected based on a desired color level and/or surface effect, as described further herein.

In addition, as described above, one or more portions or regions of a 3D printed article described herein can be formed from a build material or combination of build materials. Any build material not inconsistent with the objectives of the present disclosure may be used. In some instances, a build material described hereinabove in Section II is used to form one or more components, regions, or voxels of a 3D printed article described herein. For example, in some embodiments, at least one build material used to form the article is optically transparent or substantially optically transparent. Transparent or substantially transparent build materials may be especially suitable for the formation of voxels of a color skin region described herein. Moreover, it should be noted that different individual voxels of a column of voxels, or of the color skin region more generally, may be formed from differing build materials. In particular, voxels of a first color can be formed from a first build material having the first color, and voxels of a second color can be formed from a second build material having the second color. In such instances, both build materials can be a build material described in Section II hereinabove, such as a composite ink described in Section II. In some cases, for example, at least one build material used to form the article comprises a composite ink comprising an optically transparent or substantially optically transparent carrier ink comprising a curable material, and a colorant dispersed in the carrier ink in an amount of about 0.01 to 5 weight %, based on the total weight of the composite ink. For other components or regions of an article, such as the opacity skin region or the interior region of the article, it may be desirable to use other build materials. For example, in some instances, an opaque build material may be used to form the voxels of an opacity skin region and/or an interior region.

Some embodiments described herein are further illustrated in the following non-limiting examples.

EXAMPLE 1

3D Colorization

Figure 5:
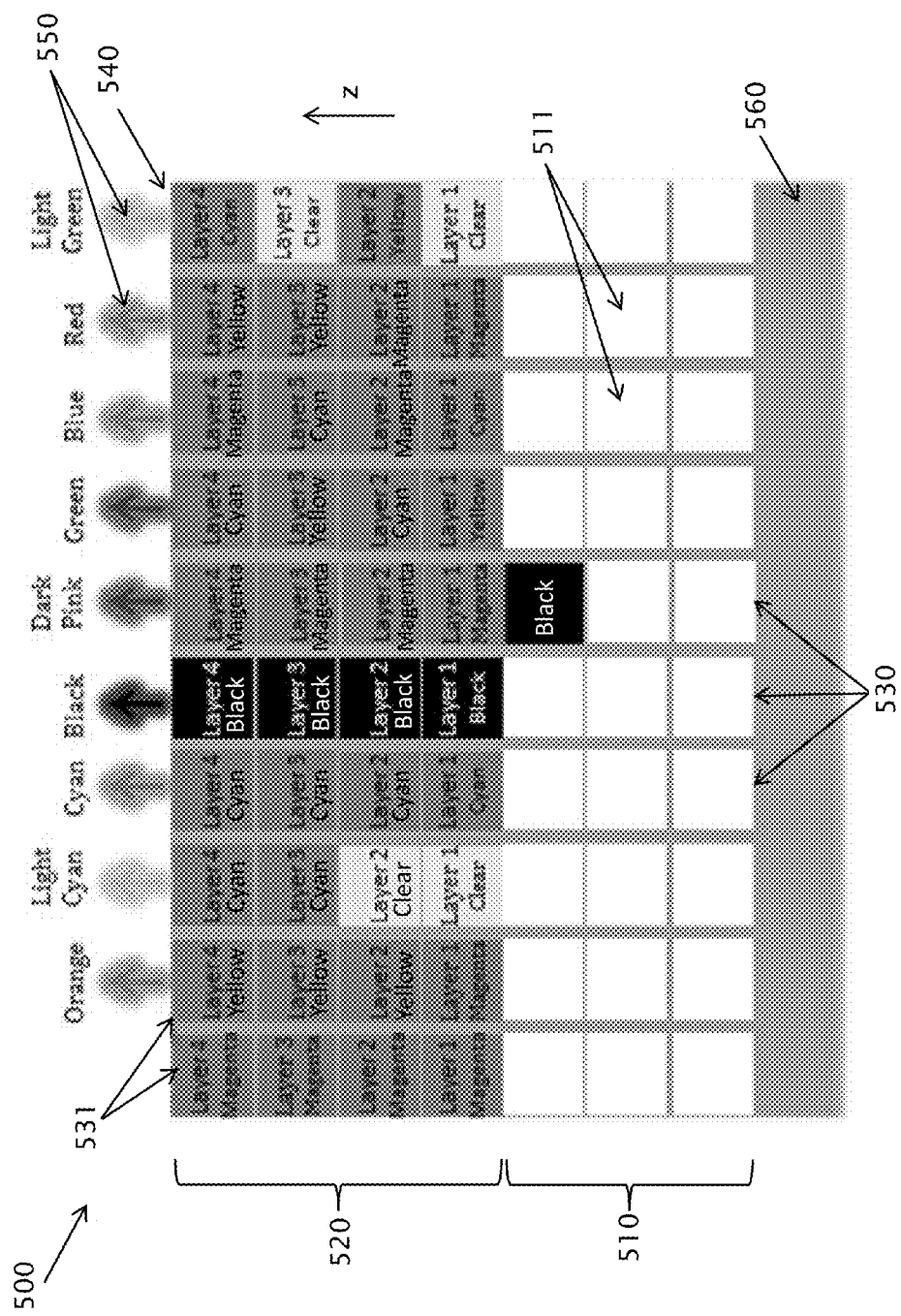
FIG. 5 illustrates schematically a sectional view of an article according to one embodiment described herein.

A color 3D article according to one embodiment described herein was printed as illustrated in FIG. 5. With reference to FIG. 5, the article (500) comprises a continuous interior region (510) formed from a plurality of opaque white voxels (511) and a color skin region (520) disposed over the interior region (510) in a z-direction (z). The color skin region (520) is defined by a plurality of columns (530) of voxels (531) substantially normal to a surface (540) of the article (500). In addition, at least some of the columns (530) of voxels (531) exhibit a surface color (550) resulting from a combination of the colors of a plurality of the underlying voxels (531). For example, the green surface color of the seventh column in FIG. 5 exhibits a green surface color (550) resulting from the combination of the underlying cyan and yellow voxels (531). Similarly, the dark pink surface color (550) of the sixth column results from the combination of the underlying magenta and black voxels (531).

As illustrated in FIG. 5, the interior region (510) and the color skin region (520) are disposed on a substrate (560). This substrate (560) can be the build pad of a 3D printing system or a previously deposited layer of build material or support material.

Further, it is to be understood that the surface (540) in FIG. 5 is only one exterior surface of the article (500), or one portion of one exterior surface of the article (500). Additionally, FIG. 5 presents a sectional view of the article (500). As described further herein, a similar method of 3D printing colorization as illustrated for the surface (540) of FIG. 5 can also be used to provide a desired surface color or surface color map to other exterior surfaces of the article (500). In some cases, all or substantially all of the exterior surfaces or all or substantially all of the exterior surface area of an article described herein can be colorized in a manner similar to that depicted in FIG. 5.

Moreover, it is to be understood that the z-direction (z) normal to the surface (540) of the article (500) in FIG. 5 is not necessarily the direction of 3D printing, where the "direction" of 3D printing refers to the direction in which sequentially deposited layers of build material are built up to form the 3D article (although this may be the case if the substrate (560) is a print pad of a 3D printing system). Instead, the direction of 3D printing may be any direction, as needed or desired for printing a 3D article having a desired geometry and surface colorization. In general, the article (500) and other articles described herein can be formed by assigning voxels to an interior region (510), a color skin region (520), and, if present, an opacity skin region or a reflective skin region as part of a rendering step, prior to slicing of the object for 3D printing. Thus, in some instances, the thinnest dimension of the slices and/or sequentially deposited layers of the article (500) may be oriented perpendicular to the z-direction (z) depicted in FIG. 5, rather than parallel to the z-direction. In this case, the color skin region may be located at a perimeter of the sequentially deposited layers. Other orientations are also possible.

EXAMPLE 2

3D Colorization

Figure 6:
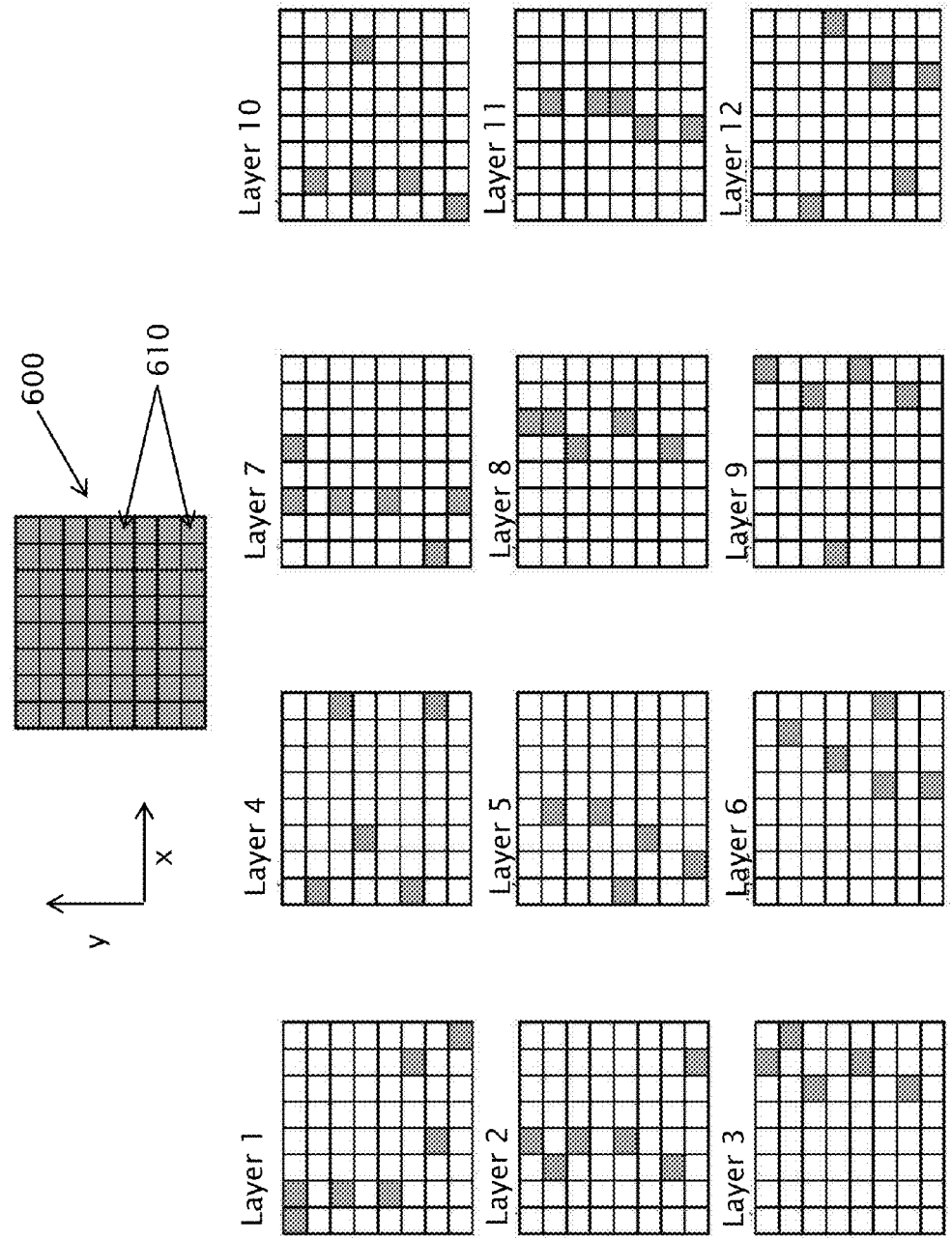
FIG. 6 illustrates schematically a sectional view of an xy-plane of an exterior surface of article according to one embodiment described herein.
Figure 7:
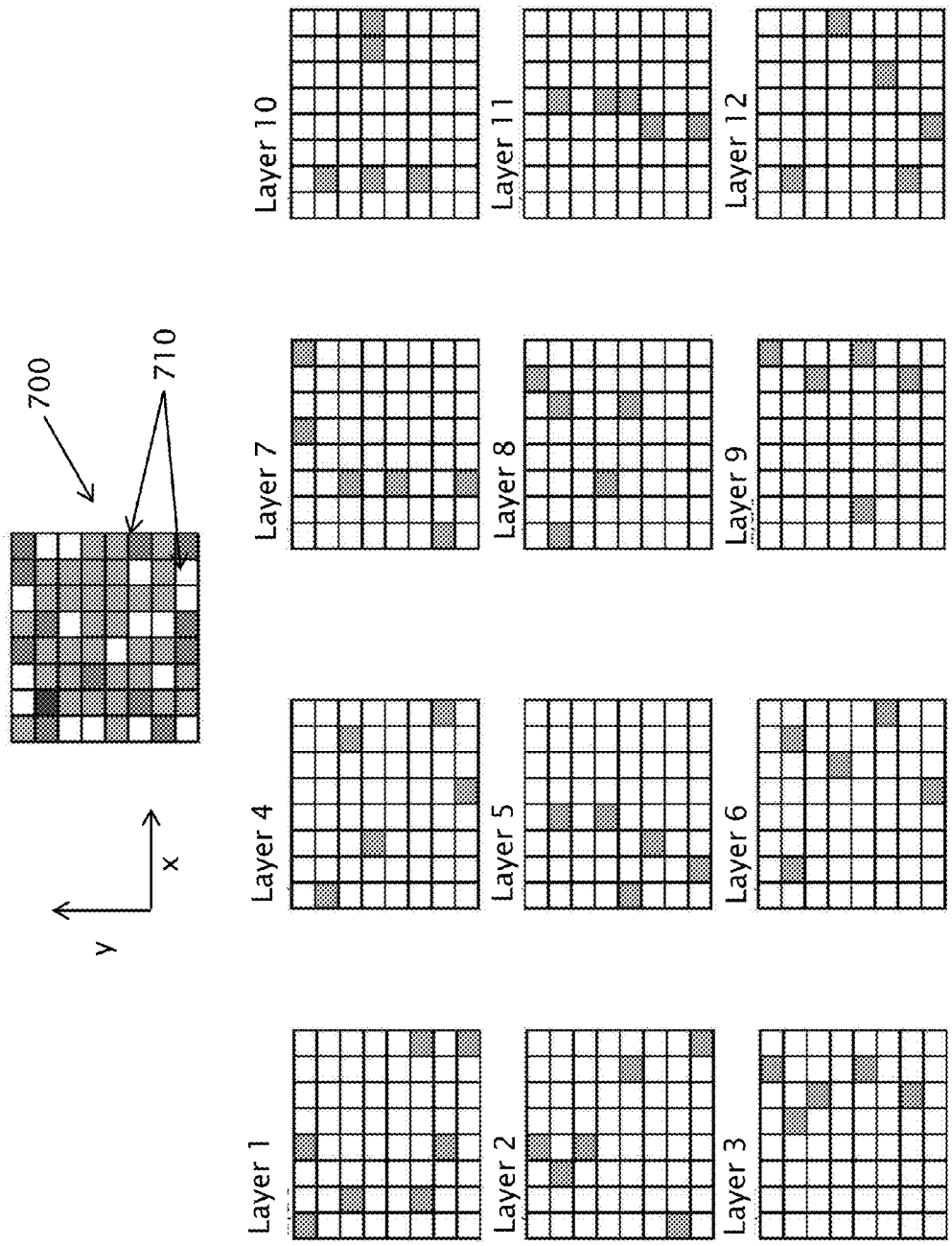
FIG. 7 illustrates schematically a sectional view of an xy-plane of an exterior surface of article according to one embodiment described herein.

As described above, the color uniformity and color accuracy of color 3D articles described herein can be affected by the alignment of voxels in the x- and y-directions within a given column. The effect of misalignment is illustrated in FIGS. 6 and 7. With reference to FIG. 6, a surface (600) of a 3D printed article in the xy-plane is illustrated. The surface (600) is defined by 64 pixels (represented as squares, 610) in an 8×8 array. Further, the pixels (610) have the same color (depicted in FIG. 6 as a specific shade of gray). Therefore, since there is no variation in color from pixel to pixel, the surface (600) exhibits a uniform color. The uniform color of the surface (600) in FIG. 6 is obtained from a plurality of columns of voxels according to some embodiments described herein. It is to be understood that the squares representing the pixels (610) can also represent the columns of voxels. The columns each include 12 voxels, such that the colorization of any given pixel (610) on the surface (600) results from a combination of 12 layers of voxels beneath. These layers are shown (in the xy-plane) as Layers 1-12 in FIG. 6. As illustrated in FIG. 6, each column includes one colored voxel (depicted as a gray square in a given Layer 1-12) and 11 clear or uncolored voxels (depicted as white squares in a given Layer 1-12). In the embodiment of FIG. 6, the voxels of each column were correctly aligned during printing of successive layers of material, such that each column included exactly one colored voxel and exactly 11 clear voxels.

In contrast, for production of the surface (700) illustrated in FIG. 7, substantial alignment of desired voxels within a given column did not occur, with the result that the pixels (710) of the surface (700) do not have a uniform color or appearance, but instead have a non-uniform or mottled appearance. As in FIG. 6, the columns of voxels of FIG. 7 were intended to each include one colored voxel (depicted as a gray square) and 11 clear voxels (depicted as white squares). However, due to misalignment of voxels in the x- and y-directions from layer to layer during printing of the article, the actual result is an irregular surface (700). Some pixels (710) of the surface (700) are too dark, since the underlying columns of voxels for those pixels contain too many colored voxels, while other pixels are too light, since the underlying columns of voxels for those pixels contain too few colored voxels. Still other pixels contain the correct number (one) of colored voxels in the underlying columns of voxels.

EXAMPLE 3

Composite Inks

Figure 8:
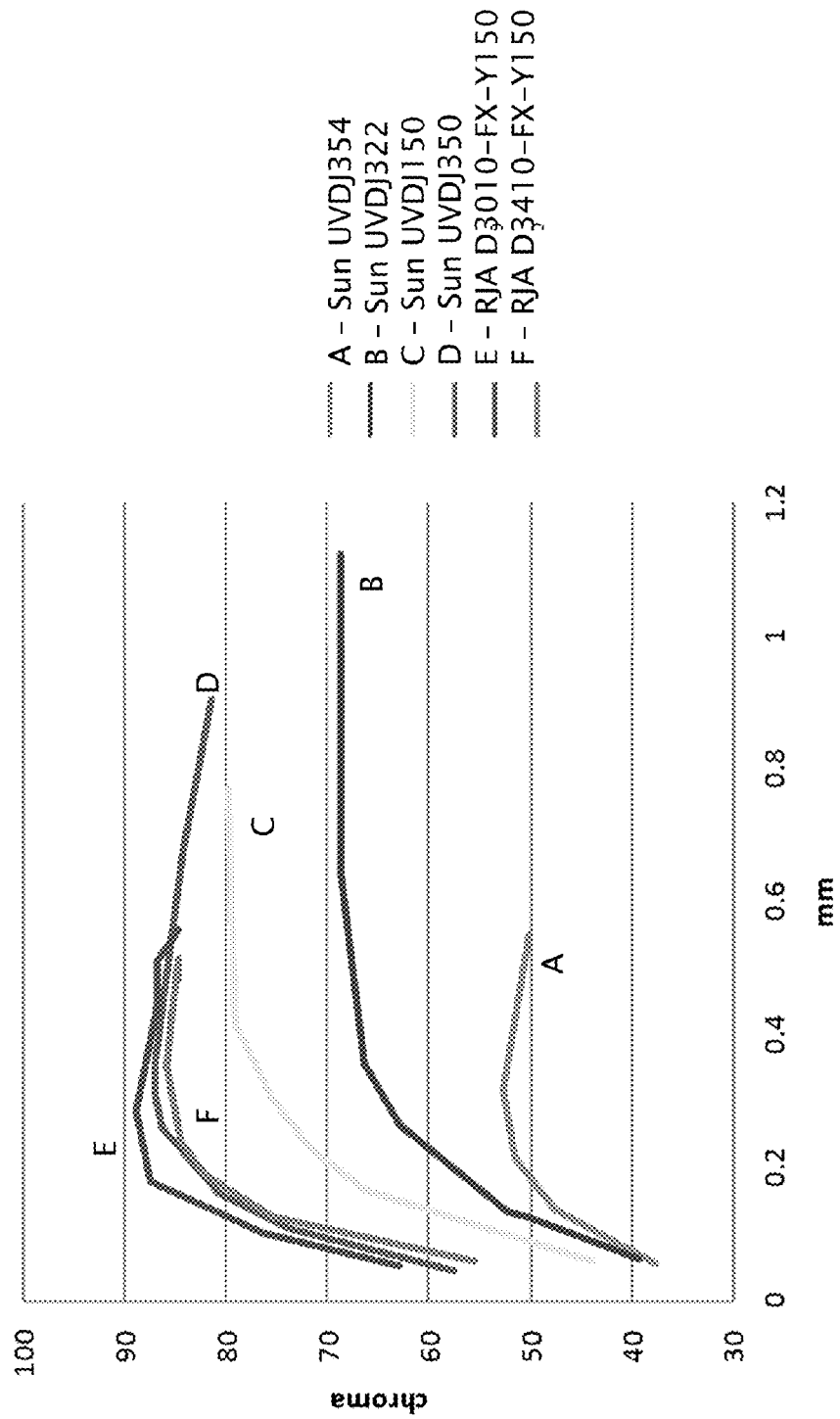
FIG. 8 illustrates plots of chroma versus layer thickness for various pigments dispersed in a carrier ink according to some embodiments described herein.

Composite inks according to some embodiments described herein were prepared as follows. Various commercial pigments were disposed in carrier inks described herein having an optical transparency of over 90% transmission. Specifically, the carrier inks included urethane (meth)acrylate oligomers (15-25 wt. %), non-oligomeric mono(meth)acrylates (28-42 wt. %), non-oligomeric di(meth)acrylates (28-36 wt. %), non-oligomeric tri(meth)acrylates (8-12 wt. %), stabilizer (0.1-0.2 wt. %), and photoinitiator (2-4 wt. %). The commercial pigments included Sun UVDJ354, Sun UVDJ322, Sun UVDJ150, Sun UVDJ350, RJA D3010-FX-Y150, RJA D3410-FX-Y150, and others provided in Table I below. The composite inks were then jetted into layers having various thicknesses and their chromatic properties measured. The chroma values of some composite inks as a function of layer thickness are plotted in FIG. 8. For a given colorant, the optimum absorption of light occurs at a certain amount of colorant. Above this optimum, the color can become too dark (when plotted lines begin curving downward). Below this optimum, the color can be too light.

Figure 9:
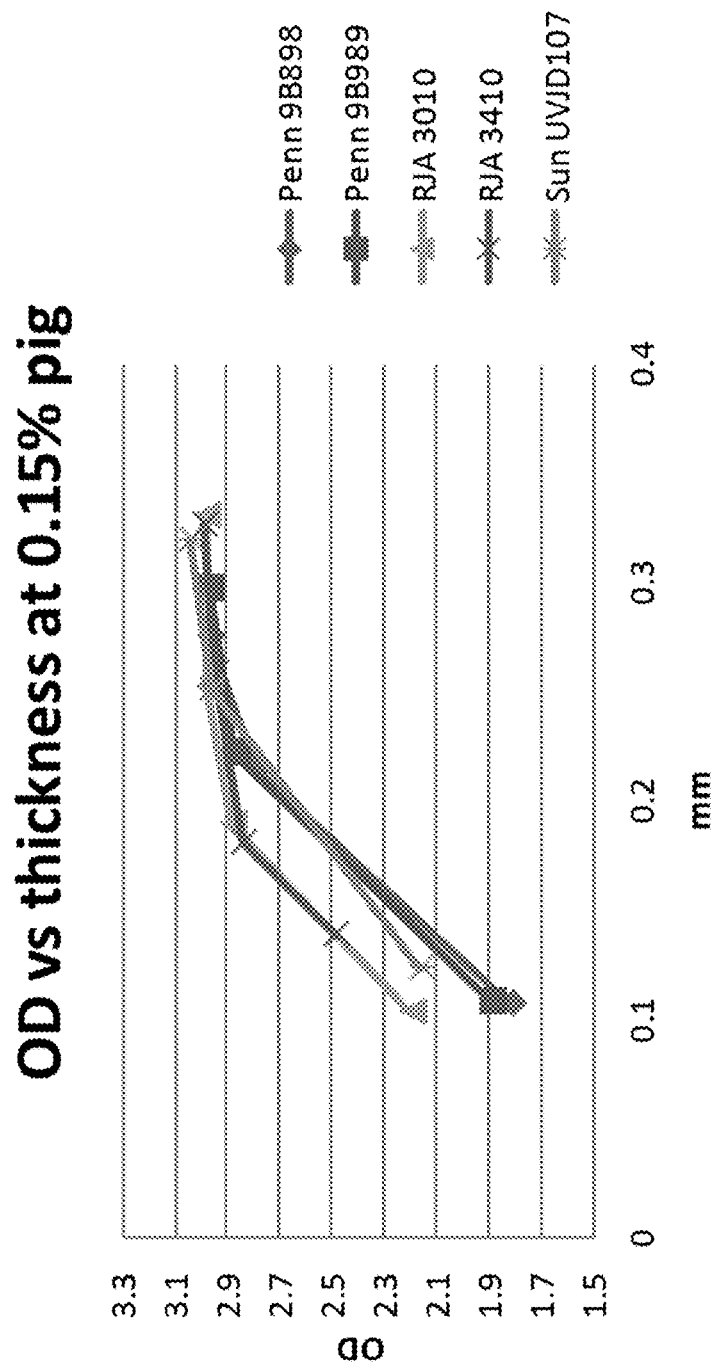
FIG. 9 illustrates plots of optical density versus layer thickness for various pigments dispersed in a carrier ink according to some embodiments described herein.
Figure 10:
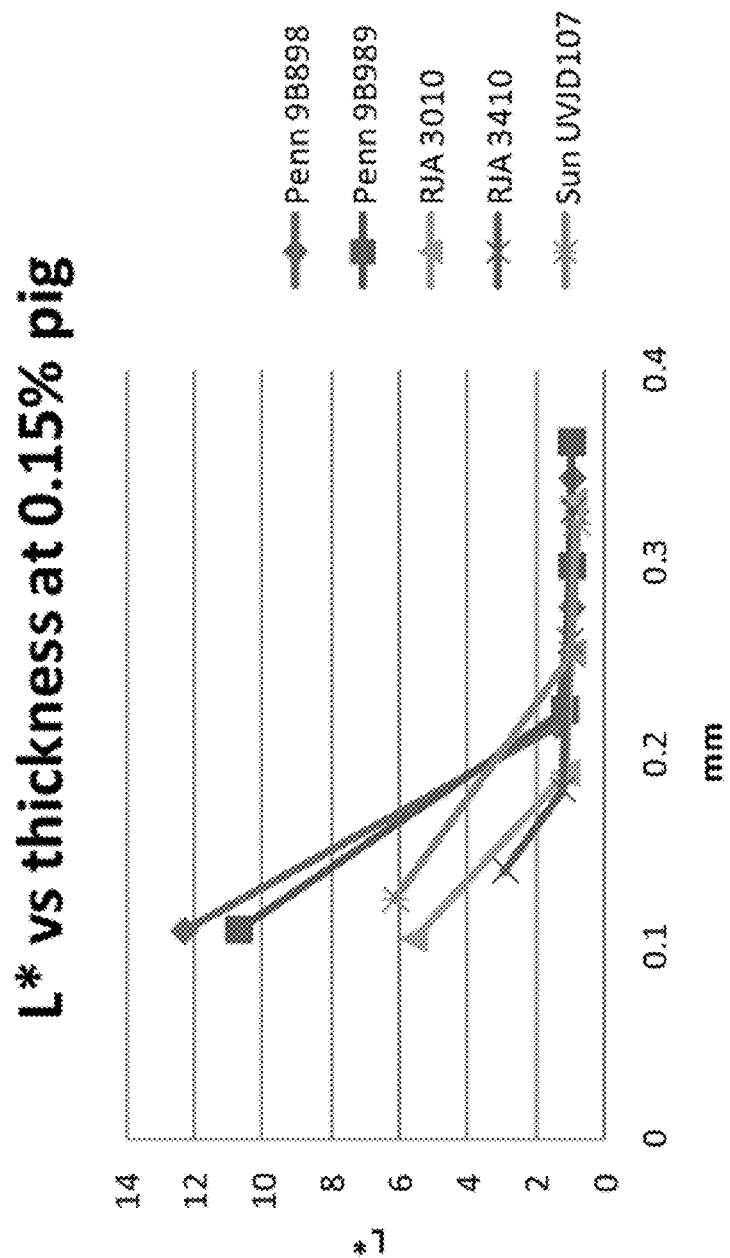
FIG. 10 illustrates plots of lightness versus layer thickness for various pigments dispersed in a carrier ink according to some embodiments described herein.

Cyan, yellow, and magenta pigment loads were designed to impart the maximum chromaticity at 0.3 mm and 0.15 mm layer thickness. For black-colored ink, the pigment load was chosen to impart the maximum optical density (OD) or the lowest lightness (L*). FIG. 9 illustrates plots of optical density versus layer thickness for various black-colored inks. FIG. 10 illustrates plots of lightness versus layer thickness for the same black-colored inks.

Additional results are provided in Table I below.

TABLE I

Pigment Loading Amounts

| Pigment | wt % for 0.30 mm colored layer | wt % for 0.15 mm colored layer |
|---|---|---|
| UVDJ354 (cyan, Sun Chemical) | 0.053 | 0.11 |
| UVDJ554 (cyan, Sun Chemical) | | 0.11 |
| UVDJS554 (cyan, Sun Chemical) | | 0.11 |
| UVDJ150 (yellow, Sun Chemical) | 0.069 | 0.14 |
| UVDJ322 (magenta, Sun Chemical) | 0.059 | 0.12 |
| UVDJ350 (yellow, Sun Chemical) | 0.060 | 0.12 |
| D3010-FX-Y150 (yellow, RJA Dispersions) | 0.041 | 0.082 |
| D3410-FX-Y150 (yellow, RJA Dispersions) | 0.051 | 0.10 |
| UVDJ107 (black, Sun Chemical) | 0.15 | 0.30 |
| D3410-FX-K (black, RJA Dispersions) | 0.15 | 0.30 |
| D3010-FX-K (black, RJA Dispersions) | 0.15 | 0.30 |
| 9B989 (black, Penn Colors) | 0.15 | 0.30 |
| 9B898 (black, Penn Colors) | 0.15 | 0.30 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article with a surface colorization, the method comprising:
   receiving data representing the surface colorization of the article;
   transforming the data representing the surface colorization of the article into voxel data of the article, the voxel data comprising (a) location values and at least one of (b) color values and (c) transparency values for a plurality of columns of voxels normal to a surface of the article; and
   selectively depositing layers of one or more build materials onto a substrate to form the article in accordance with the voxel data,
wherein at least one column of the plurality of columns of voxels exhibits a surface color resulting from a combination of colors of at least two voxels of the column,
   wherein the at least two voxels of the column each contribute to the surface color of the column,
   wherein the at least two voxels have different color values and/or different transparency values, and
   wherein at least one build material used to form the article comprises a composite ink comprising an optically transparent or substantially optically transparent carrier ink comprising a curable material, and a colorant dispersed in the carrier ink in an amount of 0.01 to 5 weight %, based on the total weight of the composite ink, and wherein the carrier ink has an optical transparency of at least 70% transmission between 350 nm and 750 nm at a thickness of 0.01 to 10 mm.

2. The method of claim 1, wherein the plurality of columns of voxels provides an appearance to the surface of the article that corresponds to the surface colorization of the article.

3. The method of claim 1, wherein the column includes translucent voxels and opaque voxels.

4. The method of claim 1, wherein the column includes colored voxels and non-colored voxels.

5. The method of claim 1, wherein the plurality of columns of voxels define a color skin region of the article.

6. The method of claim 5, wherein the color skin region of the article has a thickness of at least two voxels.

7. The method of claim 5, wherein the color skin region of the article has a thickness of 2-32 voxels.

8. The method of claim 5, wherein the color skin region of the article is formed over an opacity skin region or a reflective skin region of the article.

9. The method of claim 8, wherein the opacity skin region of the article is formed from a plurality of opaque voxels.

10. The method of claim 5, wherein the color skin region of the article is formed over an interior region of the article.

11. The method of claim 10, wherein the interior region is black in color or white in color.

12. The method of claim 1, wherein the layers of the one or more build materials are deposited according to an image of the article in a computer readable format.

* * * * *